US009278804B2

(12) United States Patent
Goedken et al.

(10) Patent No.: US 9,278,804 B2
(45) Date of Patent: Mar. 8, 2016

(54) CONTROL SYSTEM TO AUTOMATICALLY RAISE COLLECTION MECHANISM OF SIDE LOADING COMMODITY COLLECTION VEHICLE

(71) Applicant: Kann Manufacturing Corporation, Guttenberg, IA (US)

(72) Inventors: Kenneth D. Goedken, Dubuque, IA (US); Marlin Johnson, Guttenberg, IA (US)

(73) Assignee: Kann Manufacturing Corporation, Guttenberg, IA (US)

( * ) Notice: Subject to any disclaimer, the term of this patent is extended or adjusted under 35 U.S.C. 154(b) by 0 days.

(21) Appl. No.: 14/550,027

(22) Filed: Nov. 21, 2014

(65) Prior Publication Data

US 2015/0142279 A1 May 21, 2015

Related U.S. Application Data

(60) Provisional application No. 61/907,098, filed on Nov. 21, 2013.

(51) Int. Cl.

| | |
|---|---|
| ***G06F 7/70*** | (2006.01) |
| ***B65F 3/04*** | (2006.01) |
| *B65F 3/08* | (2006.01) |
| *B65F 3/12* | (2006.01) |
| *B65F 3/02* | (2006.01) |

(52) U.S. Cl.

CPC . *B65F 3/04* (2013.01); *B65F 3/041* (2013.01); *B65F 3/08* (2013.01); *B65F 3/12* (2013.01); *B65F 2003/023* (2013.01); *B65F 2003/0276* (2013.01)

(58) Field of Classification Search

CPC .................................... B65F 3/00; B65F 3/08

See application file for complete search history.

(56) References Cited

U.S. PATENT DOCUMENTS

| | | | | |
|---|---|---|---|---|
| 5,954,470 | A * | 9/1999 | Duell et al. | 414/525.6 |
| 2013/0039728 | A1* | 2/2013 | Price et al. | 414/408 |
| 2013/0239902 | A1* | 9/2013 | Venne | 119/453 |

* cited by examiner

*Primary Examiner* — Michael D Lang

(74) *Attorney, Agent, or Firm* — Brett D. Papendick; Shuttleworth & Ingersoll, PLC

(57) ABSTRACT

A control apparatus to automatically raise the collection mechanism of a side loading apparatus to a parked position spaced sufficiently above the roadway to prevent the collection mechanism from striking the roadway when raised or other uneven roadway surfaces are encountered.

16 Claims, 6 Drawing Sheets

CONTROL SYSTEM TO AUTOMATICALLY RAISE COLLECTION MECHANISM OF SIDE LOADING COMMODITY COLLECTION VEHICLE

CROSS-REFERENCE TO RELATED APPLICATIONS

The present application claims priority to provisional patent application 61/907,098 which was filed on Nov. 21, 2013, and is hereby expressly incorporated by reference in its entirety.

BACKGROUND

The present invention pertains to side loading commodity collection vehicles and particularly to such vehicles which have collection mechanism which can reach away from the vehicle to latch to a commercial or residential refuse container spaced away from the vehicle.

Currently commodity collection vehicles equipped with side loading mechanisms are operated by an operator/ driver who operates the collection mechanism through controls located in the cab of the vehicle. The operator activates the collection mechanism by directing it to lower, to extend away from the vehicle, to latch to a refuse container and to raise the container along a vertical track on the storage body until the container is tipped so that its contents fall into a load opening at the top of the transport body. The operator then reverses the operation by lowering the container, and setting the empty container back onto the ground surface and disengaging it, and then the operator draws the collection mechanism back alongside the vehicle, and finally must operate a control which raises the collection mechanism to a raised position which allows the vehicle to advance without endangering the collection mechanism through collision of the collection mechanism with the roadway or obstacles upon the roadway. Unfortunately, it is all too common that the operator neglects to take the final step of raising the collection mechanism to the parked position and therefore when the vehicle encounters uneven roadway surfaces or roadway obstacles, the collection mechanism can be damaged by striking the roadway, leading to expensive repairs.

BRIEF SUMMARY OF THE INVENTION

The present invention provides control apparatus to automatically raise the collection mechanism of the side loading apparatus to a parked position spaced sufficiently above the roadway to prevent the collection mechanism from striking the roadway when raised or other uneven roadway surfaces are encountered. A control system has a sensor detecting a target. When the sensor detects the target, a signal is sent to activate a series of steps which ultimately signal a lifting mechanism to raise the collection mechanism to a specified raised position.

DETAILED DESCRIPTION OF THE INVENTION

Figure 1:
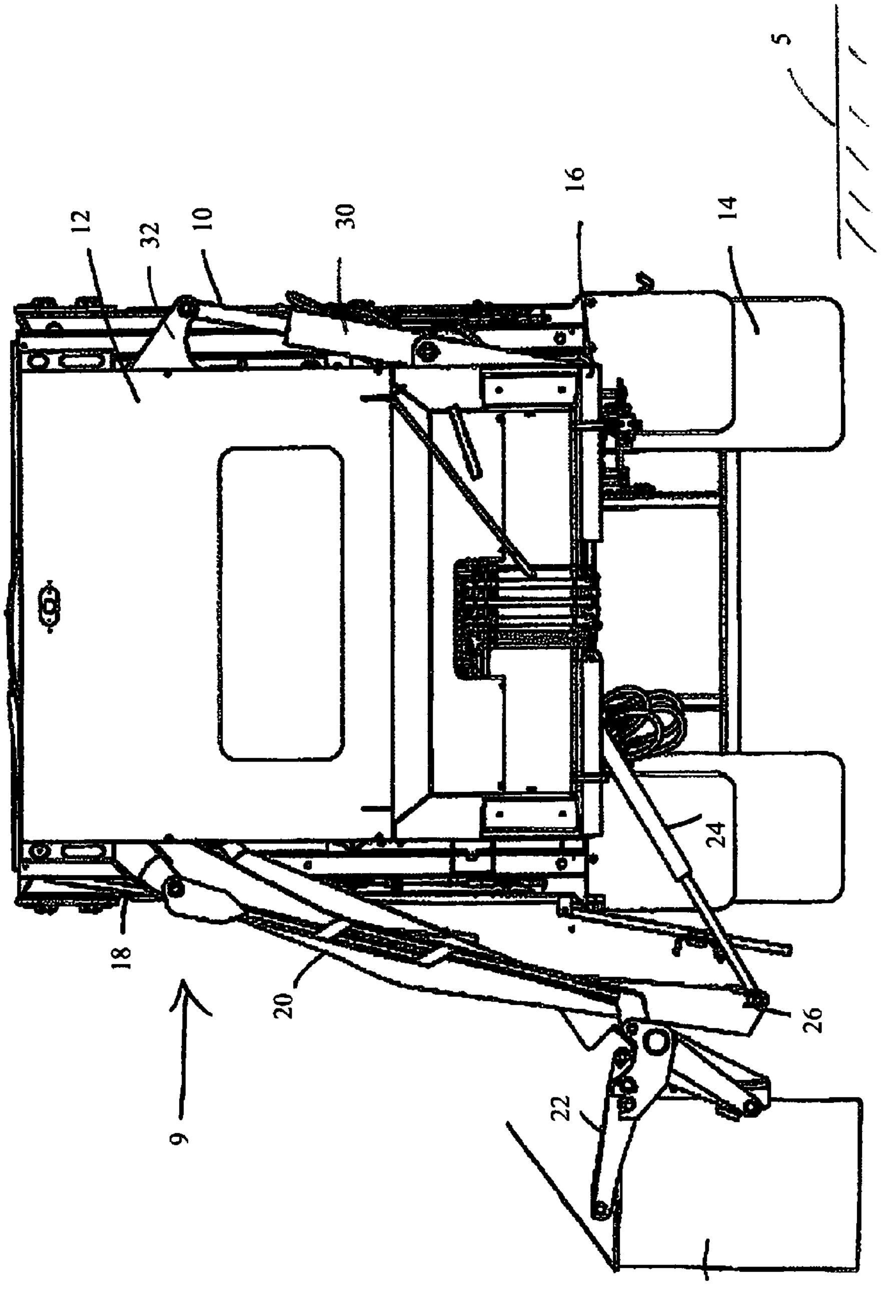
FIG. 1 is a rear elevation of an automated side loading commodity collection truck with its collection mechanism lowered and extended away from the truck and engaged with a commercial refuse container which has been raised off the ground surface by the collection mechanism.
Figure 2:
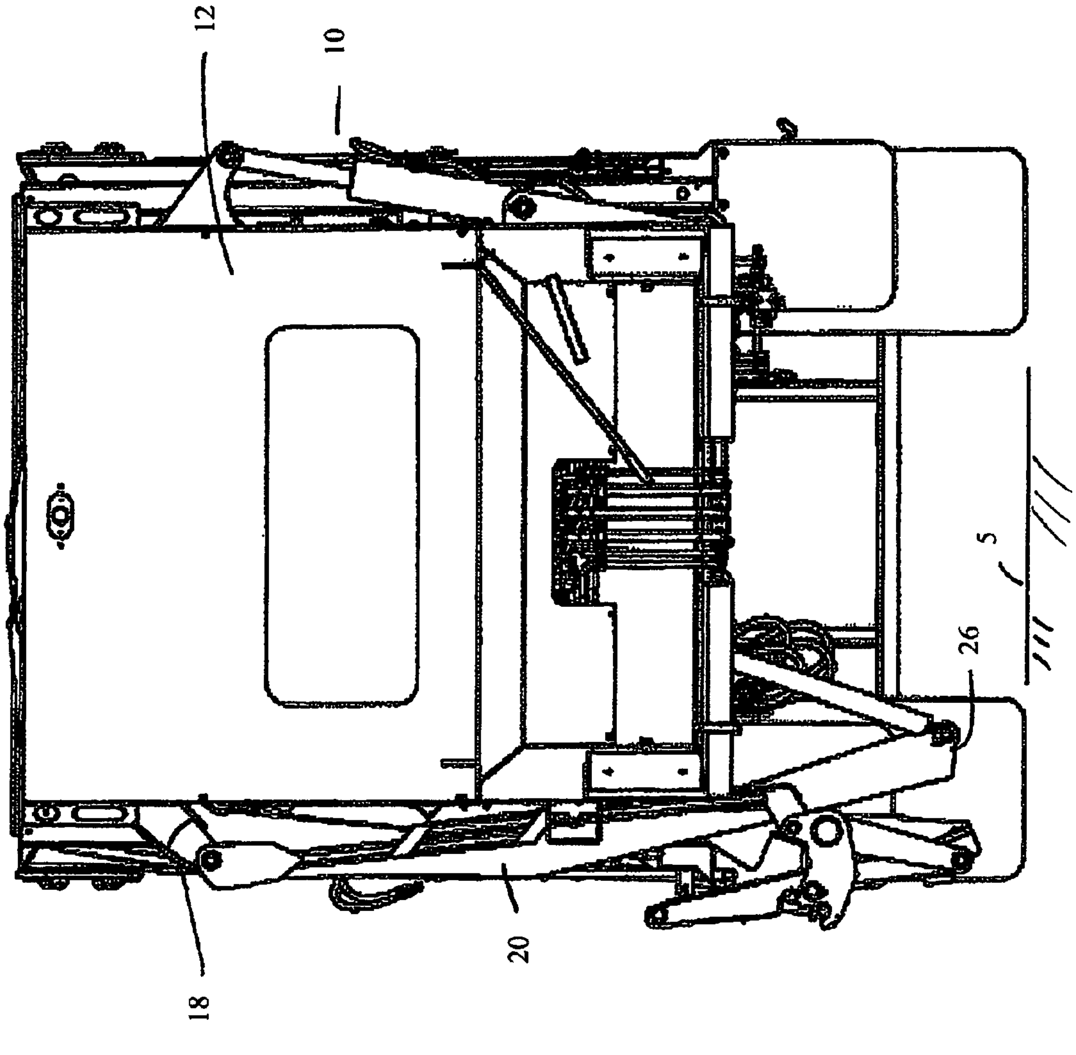
FIG. 2 is a rear elevation of the automated side loading commodity collection truck of FIG. 1 with its collection mechanism retracted and raised to its travel position raised alongside the commodity storage body of the truck.

Referring to FIGS. 1-2, a commercial side loading commodity collection truck 10 is shown from the rear. The truck 10 is supported on wheels 14 and a commodity collection body 12 is carried on the chassis 16 of the truck 10. On street side 9 of the truck 10, a collection mechanism 20 (a pickup arm) is pivotable on body 12 and operable to pivot away from the collection body 12 and to be lowered to engage the engagement structures of a commercial refuse container 3 with container engagement assembly 22. The lower end 26 of collection mechanism 20 is extended from the truck 10 by a hydraulic cylinder 24 or equivalent driver, which moves the collection mechanism 20 away or toward the chassis 16 of the truck. Hydraulic cylinder 24 may be connected to the chassis 16 and to the lower end 26 of the collection mechanism 20. The position of the collection mechanism 20 in FIG. 1 shows that the mechanism 20 is extended and lowered and engaged with the refuse container 3, the collection mechanism 20 with container 3 having been raised off the ground prior to the container 3 being elevated along the street side wall 18 of the truck 10. Cover lift cylinder 30 is activated as the engagement assembly 22 is lifted so that cover lever 32 will pivot to raise the load opening cover (not in view) to an open position over the load opening (not in view) of the collection body 12.

FIG. 2 shows the collection mechanism 20 in its position alongside body 12 but the collection mechanism 20 remains in the lowered position with its lower end 26 only a short distance above the roadway 5. In this position, the lower end 26 is susceptible to accidentally striking the roadway 5 as the truck 10 advances when the roadway surface rises or declines under the truck 10 or when speed humps are encountered. Therefore, in the conventional truck 10, the collection mechanism 20 must be manually raised by operation of controls in the cab of the truck 10. However, according to the apparatus of this invention, the collection mechanism 20 will automatically rise to a parked position with lower end 26 raised to a parked, ready-for-travel position, with the lower end 26 of the collection mechanism 20 raised at least approximately twelve inches above the roadway 5.

Figure 3:
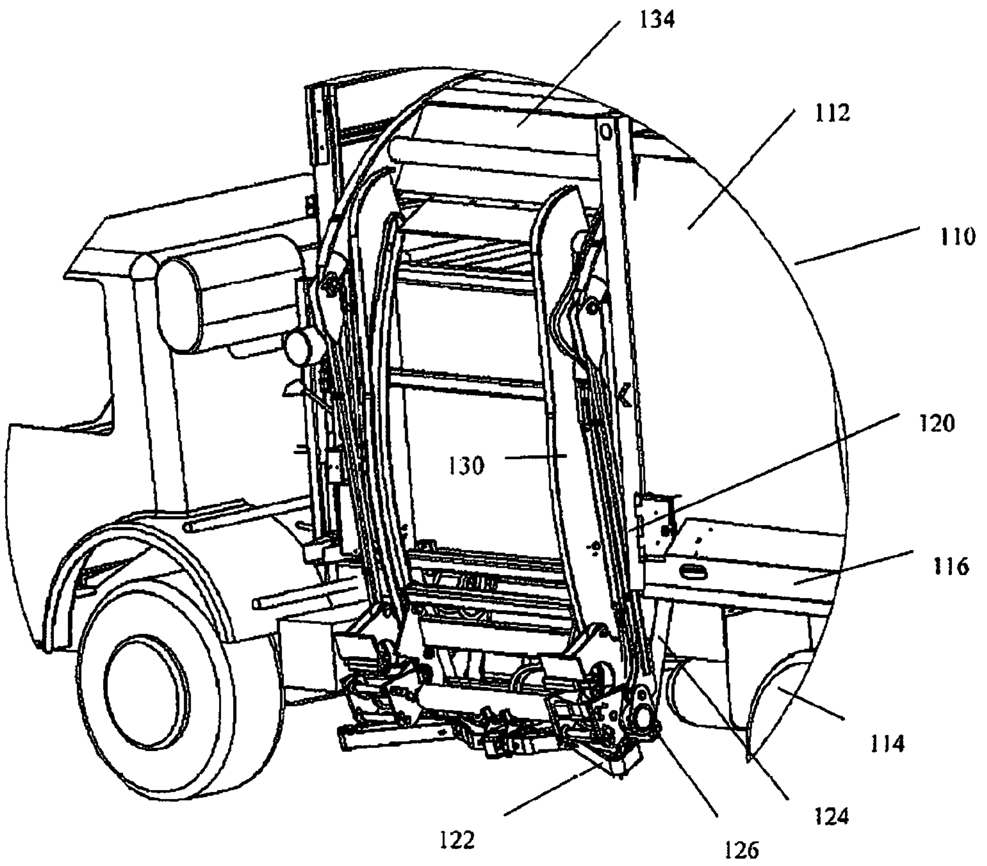
FIG. 3 is a perspective of a side loading apparatus on a residential refuse collection truck with its collection mechanism retracted and raised to a position for advance of the truck over the roadway.

Referring now to FIG. 3, a residential refuse collection truck 110 is illustrated with its collection mechanism 120 in the travel-ready position with the collection mechanism 120 retracted alongside the chassis 116 of the truck 110 and raised to a parked position. The cover 134 of the load opening of the collection body 112 is shown lowered to its closed position. The collection mechanism 120 is equipped with a gripper assembly 122 which is capable of grasping an upright residential-type refuse bin. In operation the collection mechanism 120 is extended away from the collection body 112 by hydraulic cylinders 124 and will be lowered as necessary so that the gripper assembly 122 can grasp a residential refuse bin around its upright sidewalls. The collection mechanism 120 is then drawn back alongside the collection body 120 and the collection mechanism 120 is elevated by lift arms along tracks 130 as the cover 134 is raised by a hydraulic cylinder or other suitable driver, and then the grasped refuse bin is tipped sufficiently to empty its contents into the load opening of the collection body 112.

Figure 5:
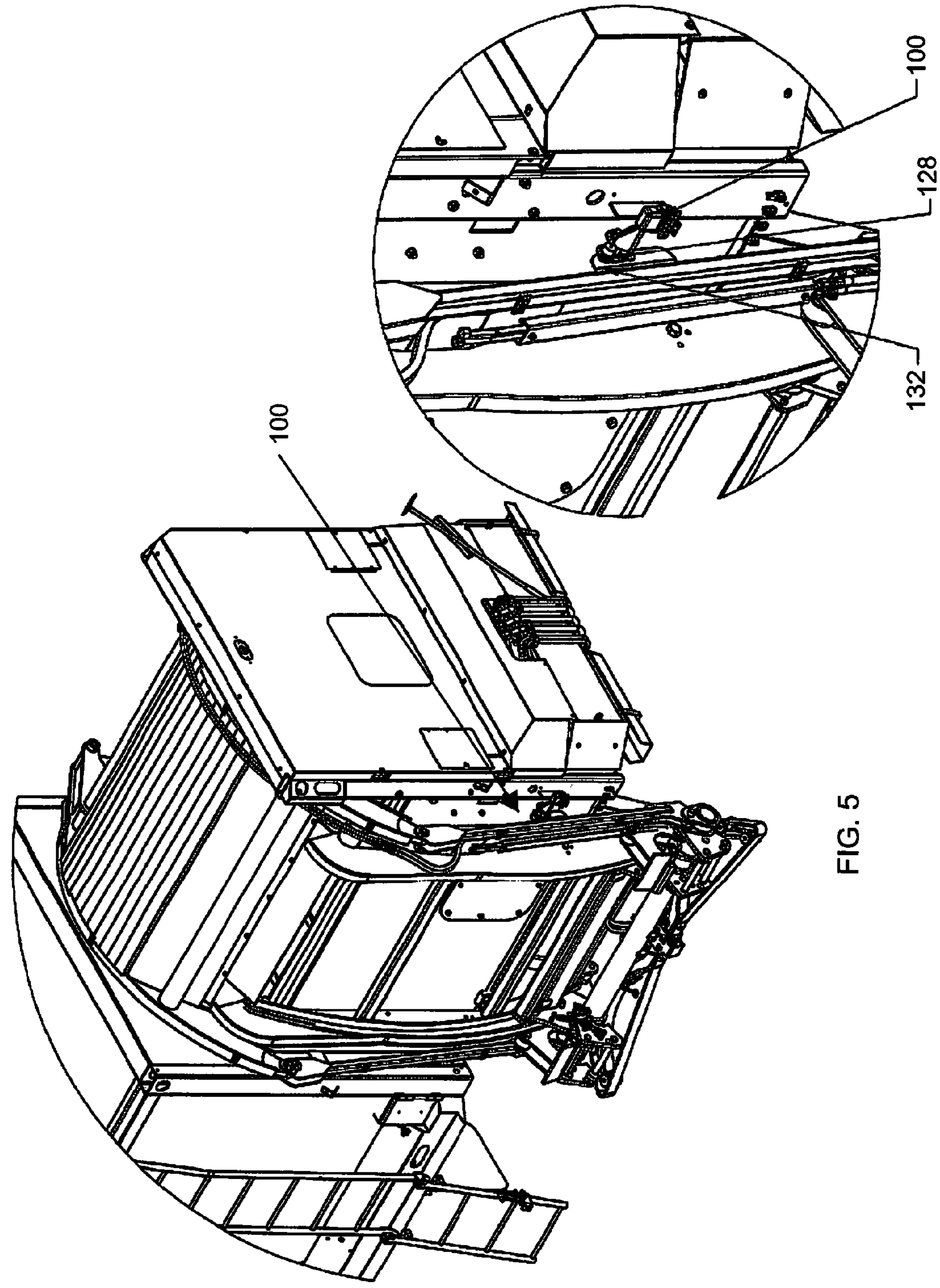
FIG. 5 is a perspective view of the control apparatus.
Figure 6:
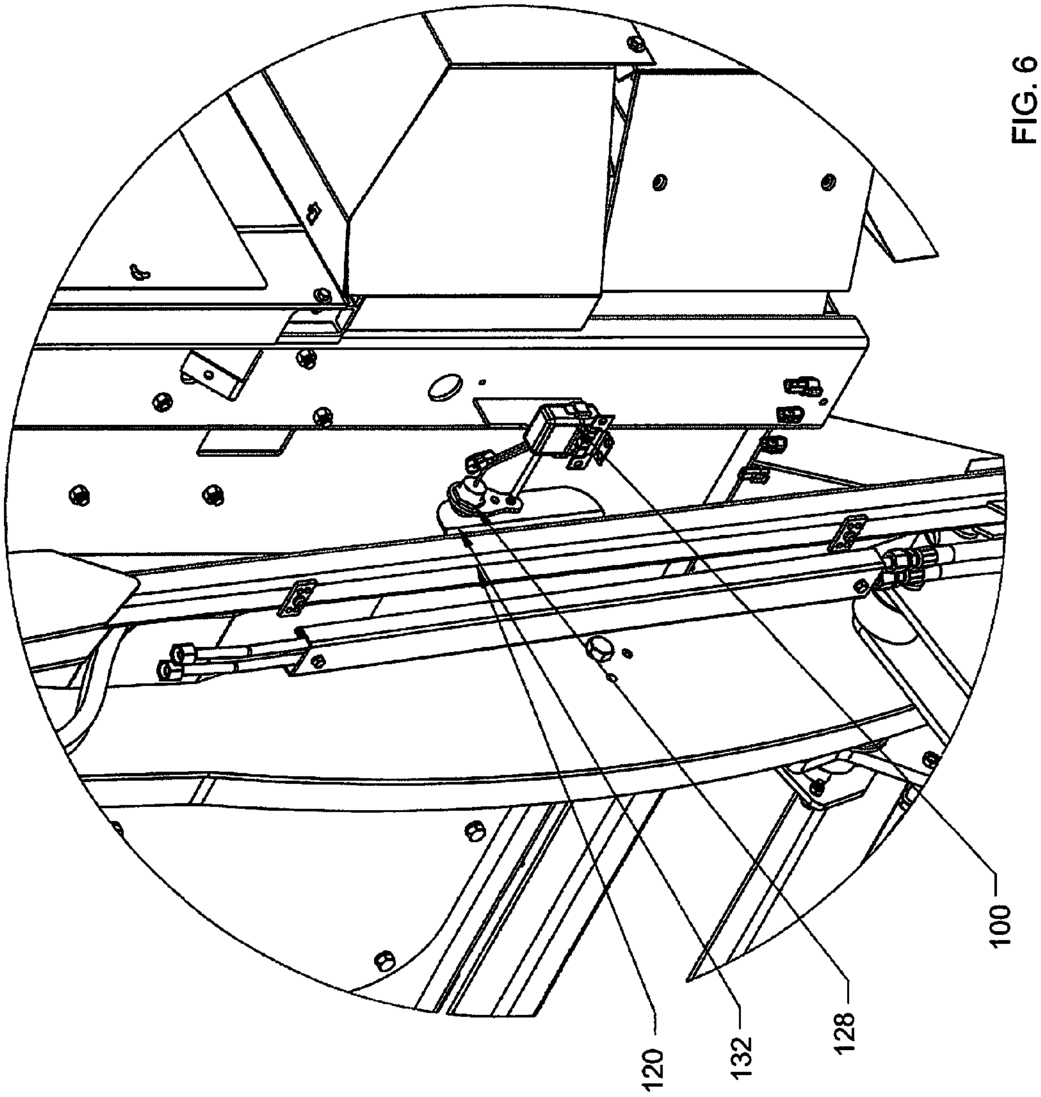
FIG. 6 is a detailed view of FIG. 5.

Now referring additionally to FIGS. 5 and 6, after emptying the refuse bin, the collection mechanism 120 is lowered along the tracks 130 and extended away from the truck chassis 116 in order to place the refuse bin at approximately its starting position spaced away from the truck 110, whereupon the gripper assembly 122 releases the refuse bin. The arm is then retracted by operator control, and the control apparatus 100 is enabled to assume control of the collection mechanism's height and the control apparatus 100 automatically senses the proximity of the collection mechanism 120 to the body 112 and raises the collection mechanism 120 to its travel-ready position such that the lower end 126 of the collection mechanism 120 is safely stowed at least twelve inches above the ground surface. Control apparatus 100 comprises a proximity sensor 128 mounted to the body 112 and a target 132 carried on the collection mechanism 120.

Figure 4:
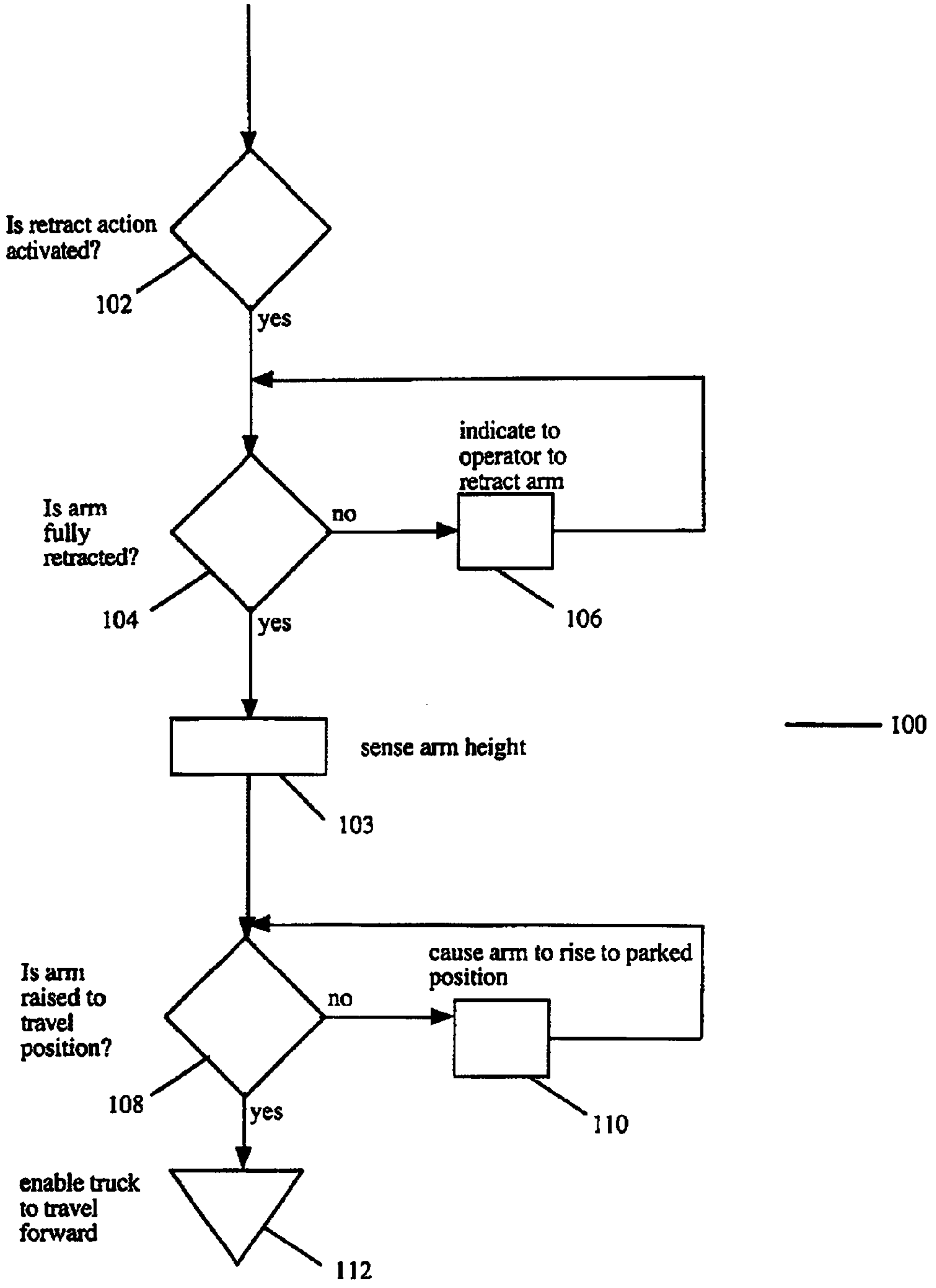
FIG. 4 is a flow chart showing the control sequence for automatically returning the collection mechanism to its travel position before the commodity collection truck advances.

FIG. 4 provides a schematic flow chart depicting the control steps for the improved control apparatus 100 according to this invention. When the refuse container has been emptied, lowered, and moved to roughly its starting position spaced away from the truck 10/110, the operator reverses operation of the collection mechanism 20/120 to retract it toward the truck body 12/112 at step 101. At step 102, the proximity sensor 128 on the body 112 senses for the target 132 mounted to the collection mechanism 20/120. If the proximity sensor 128 does not detect the target 132, then the control apparatus 100 at step 103 allows the operator to continue to operate the collection mechanism 20/120 until the collection mechanism 20/120 is retracted fully to the side of the truck body 12/112.

Once the proximity sensor 128 detects presence of the target 132 at step 102, then a relay is activated at step 104 which activates a solenoid, preferably a pneumatically operated solenoid, at step 105 which causes the hydraulic valve of the hydraulic system of the collection truck 10 to shift at step 106 such that at step 107, the hydraulic system of the truck 10 raises the retracted collection mechanism 20/120 to its raised, travel-ready position with its lower end 26/126 positioned at least about twelve inches above the travel surface 5 of the roadway. At step 108, the truck 10/110 is now ready to travel along the roadway either in forward or reverse, without undue risk of damage to the collection mechanism 20/120.

The invention claimed is:

1. An apparatus to control placement of a collection mechanism of a side loading commodity collection vehicle, comprising:

a sensing apparatus responsive to the position of the collection mechanism relative to a sidewall of the vehicle;

a control apparatus to raise the collection mechanism to a parked position when the collection mechanism is fully retracted to a position alongside the side loading commodity collection vehicle wherein a lower end of the collection mechanism will be raised a specified distance above a surface of a roadway supporting the side loading commodity collection vehicle;

the control apparatus automatically operable to raise the collection mechanism to the parked position without intervention of an operator of the side loading commodity collection vehicle;

the parked position is automatically raised by the control apparatus to maintain the specified distance when the sensing apparatus detects a height of the surface that can cause damage to the collection mechanism.

2. The apparatus of claim 1, wherein:

the control apparatus comprises a proximity sensor.

3. The apparatus of claim 2, wherein:

the control apparatus further comprises a target.

4. The apparatus of claim 3, wherein:

the proximity sensor can sense the target;

the control apparatus selectively activates a relay.

5. The apparatus of claim 4, wherein:

the relay actuates a second control mechanism.

6. The apparatus of claim 5, wherein:

the second control mechanism is a solenoid.

7. The apparatus of claim 6, wherein:

the solenoid selectively activates a lifting mechanism which raises the collection mechanism.

8. A control system to raise a collection mechanism on a side loading commodity collection vehicle to a travel position, comprising:

a sensing apparatus responsive to presence of a target element on the collection mechanism;

a control apparatus to activate a lifting mechanism to raise the collection mechanism to a travel position when the sensing apparatus detects presence of the target element;

wherein the collection mechanism is raised sufficiently that a lower end of the collection mechanism is spaced at least a clearance distance above a surface of a roadway on which the commodity collection vehicle is operable;

the travel position is automatically raised by the control apparatus to maintain the clearance distance when the sensing apparatus detects a height of the surface that can cause damage to the collection mechanism.

9. The control system of claim 8, wherein:

the control system selectively activates a relay.

10. The control system of claim 9, wherein:

the relay actuates a regulator.

11. The control system of claim 10, wherein:

the regulator is a solenoid.

12. The control system of claim 11, wherein:

the solenoid selectively activates a lifting mechanism which raises the collection mechanism.

13. A control system to raise a collection mechanism on a side loading commodity collection vehicle to a travel position, comprising:

a sensing apparatus responsive to presence of a target element on the collection mechanism;

a control apparatus to activate a lifting mechanism to raise the collection mechanism to a travel position when the sensing apparatus detects presence of the target element;

wherein the collection mechanism is raised sufficiently that a lower end of the collection mechanism is spaced at least a clearance distance above a surface of a roadway on which the commodity collection vehicle is operable;

the sensing apparatus is a proximity sensor, the control apparatus comprises a relay selectively activated by a signal from the proximity sensor the travel position is automatically raised by the control apparatus to maintain the clearance distance when the sensing apparatus detects a height of the surface that can cause damage to the collection mechanism.

14. The control system of claim 13, wherein:

the control apparatus further comprises a hydraulic valve selectively shifted when the relay is activated.

15. The control system of claim 14, wherein:

the control apparatus further comprises a hydraulic cylinder responsive to a shift of the hydraulic valve, the hydraulic cylinder operable to raise the collection mechanism to the travel position.

16. The control system of claim 15, wherein:

the travel position is approximately twelve inches above the surface.

* * * * *